United States Patent [19]

Hill et al.

[11] 4,040,654
[45] Aug. 9, 1977

[54] LINKAGE FOR HINGED TAILGATES

[75] Inventors: Max Lee Hill, Listie; Richard James Kimmel, Stoystown, both of Pa.

[73] Assignee: The Coleman Company Inc., Wichita, Kans.

[21] Appl. No.: 655,133

[22] Filed: Feb. 4, 1976

[51] Int. Cl.² .............................................. B62D 33/02
[52] U.S. Cl. ............................... 296/57 R; 217/60 E; 292/263
[58] Field of Search ............. 296/57 R, 51, 56, 57 A; 49/357; 292/263, 238, 339; 217/60 E

[56] References Cited

U.S. PATENT DOCUMENTS

| 2,631,880 | 3/1953 | Vigmostad | 292/263 X |
| 3,064,846 | 11/1962 | Thomas | 292/263 X |

Primary Examiner—Philip Goodman
Attorney, Agent, or Firm—Tilton, Fallon, Lungmus, Chestnut & Hill

[57] ABSTRACT

Two arms of an articulated linkage are pivotally connected together. The distal end of one arm is connected at a pivot point to the side of the vehicle body, and the distal end of the other arm is connected to a tailgate pivot screw located on a linkage plate attached to the tailgate. When the arms are extended, the tailgate is held in a horizontal open position. As the tailgate is raised to the closed position, the connecting pivot point of the arms is moved downward, and a projecting guide tab on the linkage plate gathers the articulated linkage. A lock lever pivoted on the side of the vehicle has a slot to snap over the tailgate pivot screw of the tailgate, and is locked with a wing nut on the screw.

5 Claims, 2 Drawing Figures

LINKAGE FOR HINGED TAILGATES

BACKGROUND OF THE INVENTION

This invention relates to fastening devices for the hinged or pivoted tailgates of trailers, pick-up trucks, and the like; and more particularly to those having a horizontal open position for the tailgate.

As is well known, the so-called tailgate of trailers, trucks, and freight-moving vehicles are customarily hinged to the trailer or truck body at their lower edges for pivoted movement on a horizontal axis from a vertical closed position to a horizontal open position, and fastening devices which may be in the nature of link chains or pivoted links are provided to anchor the pivoted tailgates in fully closed or rearwardly extended positions.

There are well-known objections to anchoring chains, including the annoying rattle set up by loose or slack portions of the chain, continuous wear on the rattling and swinging-free portions of the anchoring chain, the inability of the common chain anchoring means to draw and hold the tailgate tightly closed, and the fact that the fastening chains are both difficult and slow to manipulate.

Known arrangements with pivoted links for closing tailgates and holding them in the horizontal open position are often quite complex.

SUMMARY OF THE INVENTION

An object of this invention is to provide a simple and effective mechanism for holding the tailgate of a vehicle in either the horizontal open position or locked in the vertical closed position.

The linkage according to the invention comprises two link arms pivotally connected together to form an articulated link, with one arm connected by a pivot to the vehicle side panel, and the other arm having a hole placed on a tailgate pivot screw attached to the tailgate to form a pivot. When the link arms are extended in line the tailgate is held in the open horizontal position. To close the tailgate, the linkage is pressed downward to fold it at the junction of the link arms, as the tailgate is raised. A linkage plate on the tailgate has a projecting guide tab to gather the linkage as the tailgate swings up to the closed position.

Another feature of the invention is a lock lever pivoted on the vehicle side panel at the same pivot as the articulated link. The lock lever has a slot to snap over the tailgate pivot screw of the tailgate to hold it closed when the articulated link is folded. A wing nut on the tailgate pivot screw is used to secure the lock lever in place. The lock lever may be on the same pivot on the vehicle body as one of the link arms.

DETAILED DESCRIPTION

Figure 1:
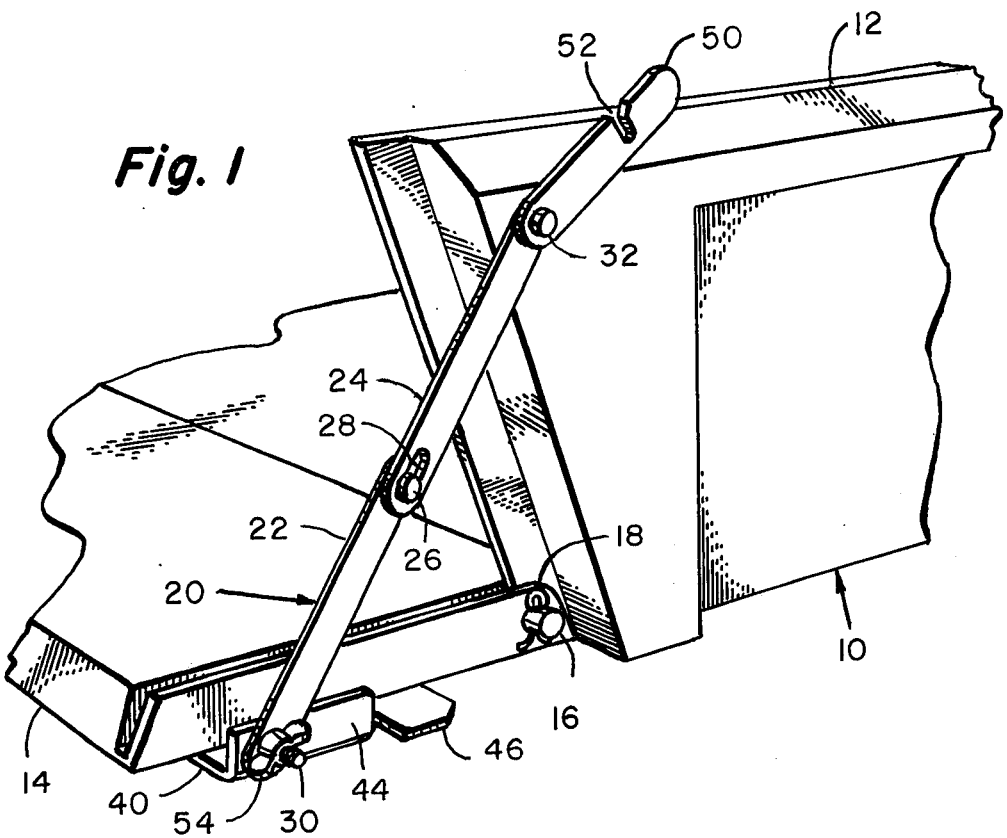
FIG. 1 is an upper rear perspective fragmentary view of a corner of a trailer body showing the articulated linkage with the tailgate in the horizonal position.

The linkage is shown in combination with a utility trailer 10. One of the functions of the vehicle 10 is to carry flat four-feet by eight-foot construction sheets, which necessitates fore-and-aft tailgates that are restrained when lowered to a horizontal position and lockable in the raised or closed position.

One corner of the trailer is shown in the drawings; and only one linkage is illustrated. The other side of the vehicle is also preferably provided with a similar linkage. The tailgate 14 is attached to the trailer by a hinge rod 16, held in by a cotter pin 18.

The articulated linkage is generally designated 20 and it comprises two link arms 22 and 24 connected together by a pivot 26. The upper link arm 24 has a slot 28 for the pivot 26 to facilitate folding. The distal end of the lower arm 22 has an aperture received on a tailgate pivot arm screw 30; and the distal end of the upper arm 24 is connected with a pivot pin 32 on the trailer side panel 12.

Figure 2:
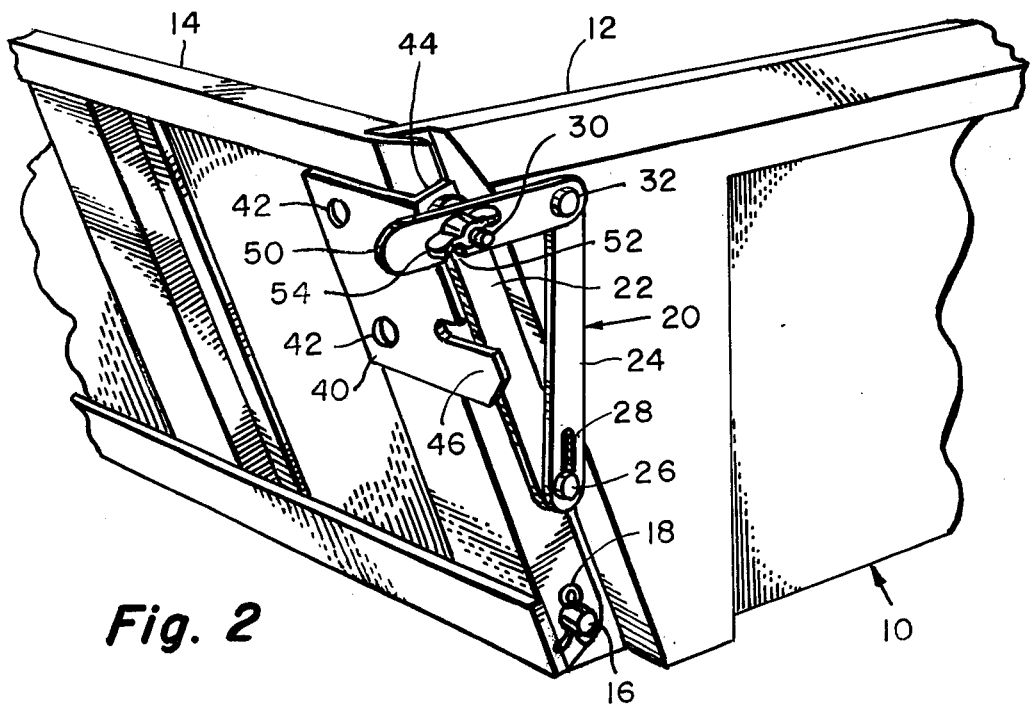
FIG. 2 is a view similar to FIG. 1 showing the linkage folded and the tailgate closed.

A linkage plate 40 is attached to the tailgate 14 with projecting weld screws 42 (FIG. 2). This linkage plate 40 holds the tailgate pivot screw 30 on its lip 44 which is turned forwardly along the side of the tailgate in the raised position of FIG. 2. The linkage plate 40 also has a projecting guide tab 46 to gather the articulated linkage as the tailgate swings to the closed position.

As shown in FIG. 1, the tailgate is held in the open horizontal position by the articulated linkage with the link arms extended in line. To close the tailgate, the pivot pin 26 is depressed slightly downward toward the hinge 16, and the tailgate is raised. The projecting tab 46 gathers the linkage. The closed position of the tailgate 14 is shown in FIG. 2.

A lock lever 50 is connected to the trailer side with the same pivot 32 as link arm 24. The lock lever has a slot 52 which snaps or fits over the pivot screw 30; and it is locked with wing nut 54 in the closed position.

Having thus described in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. A linkage used in combination with a vehicle body having an end opening and a hinged tailgate for opening and closing said end opening; said linkage comprising an articulated linkage including first and second link arms; a linkage plate attached to said tailgate; a tailgate pivot screw mounted to said linkage plate; a projecting guide tab on said plate extending laterally outwardly of the tailgate, said projecting tab being located between the tailgate pivot screw and the hinged lower edge of the tailgate; folding pivot means connecting together said first and second link arms, at least one of said link arms having a longitudinal slot receiving the folding pivot means, the distal end of said first arm defining a hole through which the tailgate pivot screw extends to form a tailgate pivot point; pivot means fixed on the vehicle body connecting the distal end of said second link arm to said vehicle body whereby said first and second link arms extended in line with the tailgate are held by said articulated linkage in a generally horizontal position in which said vehicle end opening is open, and operative by depressing said articulated linkage downward at said folding pivot means and raising the tailgate for said guide tab to gather the linkage and the tailgate to close said end opening; a lock lever pivotally connected to said vehicle body and having a slot to engage said tailgate pivot screw; and a wing nut on said tailgate pivot screw to lock the lock lever in place when said tailgate is closed.

2. A linkage as set forth in claim 1, wherein said lock lever is connected to said vehicle body on said vehicle body pivot means which connects the distal end of said second link arm thereto.

3. A linkage used in combination with a vehicle body having an end opening and a hinged tailgate for opening and closing said end opening, said tailgate having sides generally aligned with the sides of said vehicle in the closed position; said linkage comprising an articulated linkage including first and second link arms; folding pivot means connecting together said first and second link arms; a tailgate pivot screw attached to the tailgate; said first link arm having a hole through which the tailgate pivot screw extends to form a tailgate pivot point; body pivot means connecting the distal end of said second link arm to said vehicle body so that with the first and second link arms extended in line the tailgate is held by said articulated linkage in a generally horizontal position in which said end opening is open; and a projecting tab extending laterally of the side of the tailgate and located to engage said linkage at an intermediate position between its pivot connections, said tab being operative by folding the articulated linkage and raising the tailgate to gather the linkage by engaging said linkage and to hold said linkage in a generally vertical disposition in the closed position.

4. A linkage as set forth in claim 3, further including a lock lever pivotally connected to said vehicle body and having a slot to snap over said tailgate pivot screw, and nut means on said tailgate pivot screw to lock the lock lever in place.

5. A linkage as set forth in claim 3, having a linkage plate attached to said tailgate, said projecting tab being a part of the linkage plate, and said tailgate pivot screw being attached to the linkage plate.

* * * * *